United States Patent [19]

Butlin et al.

[11] Patent Number: 5,053,178
[45] Date of Patent: Oct. 1, 1991

[54] PROCESS FOR INSERT MOLDING DISPOSABLE RAZOR

[75] Inventors: C. Edward Butlin, Erie, Pa.; William T. Conrad, Jr., Shelton, Conn.

[73] Assignee: Warner-Lambert Company, Morris Plains, N.J.

[21] Appl. No.: 42,493

[22] Filed: Apr. 24, 1987

[51] Int. Cl.$^5$ .............................................. B29C 45/14
[52] U.S. Cl. ................................. 264/254; 264/255; 264/273; 264/275
[58] Field of Search ............... 264/273, 254, 255, 275; 30/32, 47, 48, 49, 50

[56] References Cited

U.S. PATENT DOCUMENTS

| | | | |
|---|---|---|---|
| 4,336,948 | 6/1982 | Couture | 264/273 X |
| 4,398,785 | 8/1983 | Hedrick | 264/255 X |
| 4,489,627 | 12/1984 | Lembke | 76/104 R |
| 4,554,735 | 11/1985 | Chen | 30/47 |

*Primary Examiner*—Leo B. Tentoni
*Attorney, Agent, or Firm*—Daniel A. Scola, Jr.; Richard S. Bullitt

[57] ABSTRACT

According to this invention a disposable, moldable plastic razor is made by a single multi stage molding process. This is accomplished by molding a blade support around a single narrow blade and using the combination of blade support and blade as the basis for subsequently molding the other moldable plastic razor elements.

In another aspect of this invention, a subassembly comprising blade support and blade is provided having certain defined spatial characteristics which provides the first "building block" for the assembled disposable razor.

7 Claims, 1 Drawing Sheet

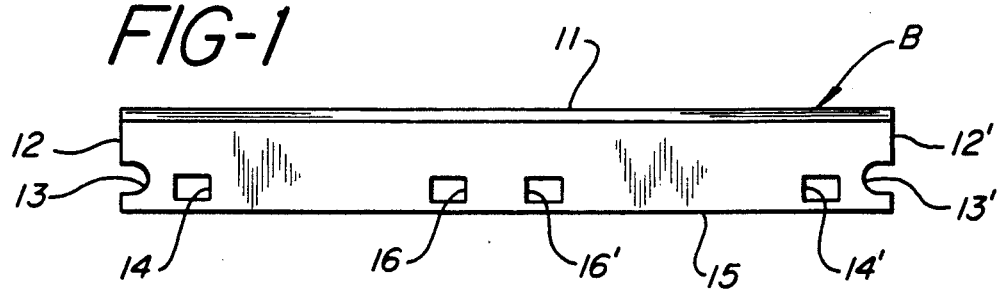
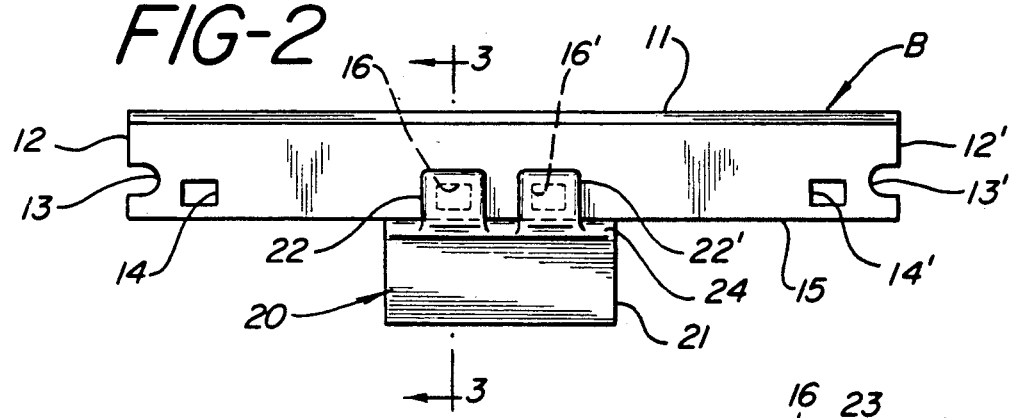
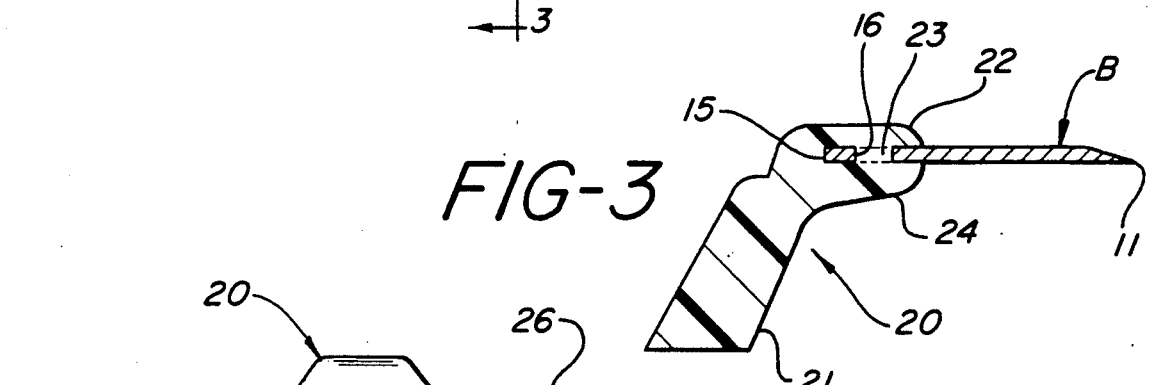
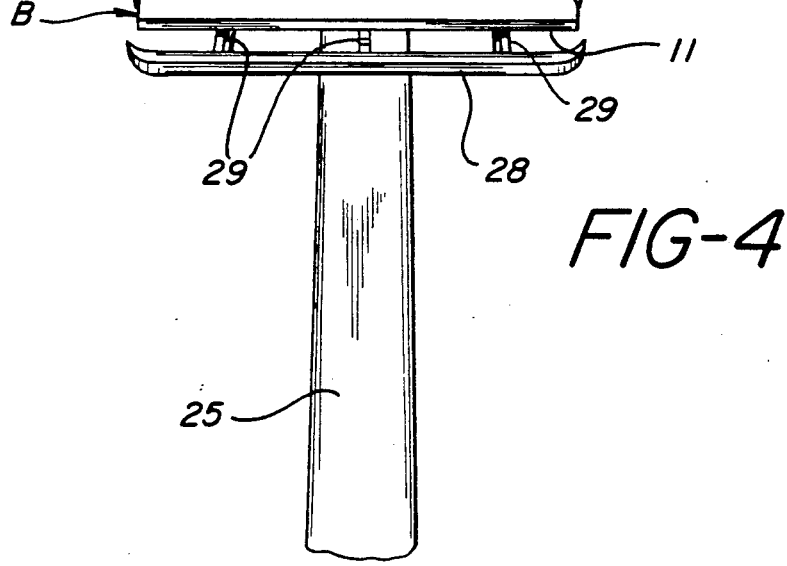

PROCESS FOR INSERT MOLDING DISPOSABLE RAZOR

FIELD OF THE INVENTION

This invention relates to a process for manufacturing a disposable razor or cartridge and particularly a disposable razor in which the plastic components are insert molded sequentially around a blade.

BACKGROUND OF THE INVENTION

Currently, disposable razors provide a substantial portion of the market for wet shaving.

With the exception of the blade or blades (and possibly a spacer) the disposable razors are made out of thermoplastic material. The various components, depending upon the ultimate design are molded separately and then assembled. For example, the "MicroTrac" disposable razor manufactured by Gillette molds a single unit blade seat, back and cap with the cap being in the form of fingers. The blade subassembly consisting of two blades and a spacer is inserted between the molded cap and seat with the finger-like projections extending from the top of the cap serving as leaf springs to retain the blade subassembly by a friction fit. This combination is then mated to a handle by press fitting a tab-finger combination. It is apparent that this process involves not only separate steps but separate work stations requiring individual subassembly and ultimately assembly.

Other assembly processes for disposable razors utilize staking from projections depending either from the cap or the seat which mate with reciprocal openings in the other part and position the blades and/or spacer. The handle is usually mated separately to the seat portion. Again, separate assembly steps at different locations is required to produce the disposable razor.

Ultimately, a disposable razor which could be assembled at a single work station having all of the plastic parts produced in a single cavity would be desirable because the steps of subassembly, final assembly and the conveying of the various components from location to location around the manufacturing area could be eliminated.

U.S. patent application Ser. No. 615,603 filed in the name of Ernest F. Krialy et al. on May 31, 1984 describes a razor with a blade having a slot therein. According to the application, the blade is permanently secured in the head portion of the razor and the handle and guard bar portion are molded integrally with the head.

British Pat. No. 1,565,296 cited during the prosecution of the above referred to application discloses making a unitary handle, guard member and blade support and then attaching a Z-shaped blade by upset rivots or the like.

U.S. Pat. No. 4,489,627 issued Dec. 25, 1984 to Lembke describes a razor manufacturing process in which a double edge strip of blade metal is parted along a center line and cropped to form two strips each containing a series of spaced apart blades connected by webs to an elongate backing strip. Each strip, which now consists of a plurality of blades and a backing strip, is fed into a molding machine in which, either the shaving unit or blade containing component of a razor, is molded directly around each individual blade. The web is then parted to release the molded razor, etc. from the backing strip. It is unclear according to the teachings of Lembke how the remaining razor components are manufactured if they are not made in a "single shot" by molding. It is apparent, however, that the molding machine completely surrounds the blade segment during molding. Lembke therefore requires the handling of an elongated strip metal, its control and insertion in either a multi cavity mold or a very large single cavity mold and the production of either a series of razors or heads joined together in a single unit which must be subsequently disassembled. Conveying of a metal web of the type described is extremely difficult when it is necessary to protect a delicate cutting edge and even more so when two cutting edges must be protected.

SUMMARY OF THE INVENTION

According to this invention a disposable, moldable plastic razor is made by a single multi-stage molding process. This is accomplished by molding a blade support around a single narrow blade and using the combination of blade support and blade as the basis for subsequently molding the other moldable plastic razor elements.

In another aspect of this invention, a subassembly comprising blade support and blade is provided having certain defined spatial characteristics which provides the first "building block" for the assembled disposable razor.

DESCRIPTION OF THE DRAWINGS

This invention may be more readily understood by reference to the drawings in which:

FIG. 1 is a plan view of a blade useful in the process of this invention;

FIG. 2 is a plan view of the blade support-blade subassembly;

FIG. 3 is a cross sectional view to be taken along the lines 3—3 of FIG. 2 of the subassembly;

FIG. 4 is a front perspective view of the assembled razor made in accordance with the teachings of this invention.

DETAILED DESCRIPTION OF THE INVENTION

A blade which essentially conventional in configuration is used for the process and subassembly of this invention. As can be seen in FIG. 1 a blade B has a first series of holes or orifices 14 and 14' positioned near the back edge 15 of the blade B and near the longitudinal ends 12 and 12' of the blade. A second set of symmetrical holes or openings 16, 16' of generally the same shape is disposed near the longitudinal center of the blade B and on either side of the middle of the blade. In this particular blade the openings 14, 14', 16 and 16' are essentially equal in size and disposed essentially axially with respect to each other.

The blade B also features a cutting edge 11 positioned on the opposite side of the blade from the back edge 15. Indentations 13 and 13' are positioned along the longitudinal edges 12 and 12' respectfully and serve to position the blade within an injection molded cavity. These locating indentations 13 and 13' provide the initial orientation to the blade for the first molding step.

The subassembly which forms one aspect of this invention, depicted in FIG. 2 and FIG. 3 is formed with a first shot injection molding. According to this invention, the subassembly must have certain defined characteristics to provide the basis for subsequent molding.

The blade support molded as a single element must provide sufficient support for the blade to prevent its undue flexing during the remainder of the process.

This invention resulted from the recognition of the difficulties encountered in the attempt to mold a blade containing element which completely surrounds the blade as part of a first (or only) molding step. It is extremely difficult to maintain the blade in a specific position while one step molding is attempted. The blade must first, be held or retained in a specific position by some means while allowing the fluid thermoplastic material to surround the parts of the blade which are ultimately covered. One means of accomplishing this is to clamp the sharpened edge of the blade but this increases the possibility of damaging the blade. Also, if the blade is to be surrounded by molded thermoplastic material, it is difficult to adequately support the blade during the injection of fluid and deflection or deformation of this thin metal strip is highly likely.

It was the recognition of these difficulties and the development of the solution pictured in FIGS. 2 and 3 which provides the basis for this invention.

By using locating means 13 and 13' initially to position the blade, and then providing a blade support which helps to minimize the blade flexing while the support 20 is formed to extend downward from the bottom of the blade at its central back portion. This positioning support, enables the successful subsequent molding of the other razor parts.

The blade support 20 has a flange 21 extending downward from a support portion 24 upon which the blade B rests. In the particular embodiment depicted in FIGS. 2 and 3, the blade is attached to blade support 20 and held in place by tab 22 which is joined to support 24 by downward projection 23. Of course a top 22, 22' which overlays the blade must be controlled in height so that the subsequent formation of a cap, or the addition of a second blade or spacer is not hindered by the projection. Parts 21, 22, 23 and 24 are a single injection molded component which both serves to support and retain the blade in its position on blade support 20.

It is contemplated that downward projection 21 will, in one embodiment, form the handle of the razor. The length or other configurational features of the downwardly extending part of support 20 is not particularly critical in that it merely provides an additional basis for positioning for subsequent molding.

After the subassembly has been formed, the remainder of the disposable razor is shaped, e.g., by injection molding, around the blade-blade support subassembly. Blade slots 14 are used to provide locations to anchor cap 26.

As can be seen in FIG. 4 the completed razor has a joindure of handle 25 to downward depending part of the blade support 20. This is overlayed by cap 26 and guard bar 28 is molded as a single element which is attached to the seat (not shown) by ribs 29.

As can be seen from the above description, several variables in process are possible within the ambit of the teachings of this invention. First, there is nothing particular critical about the size of the opening used for positioning and it can in fact be of a different size and different location as long as the blade has limited flexibility after it has been attached and the flexibility is essentially the same on both sides of the blade center so that there is no distortion. As previously mentioned, the downward projecting flange 21 can be of a variety of shapes and can in fact provide the handle means. Other positioning means can be utilized instead of notches 13 and 13' if desired and orifices 14 and 14' are not critical but alternative means of attachment are contemplated. Also it is contemplated that a twin blade assembly can be made by positioning either the blades or the blades and metal spacer by positioning notches on the blade and spacer ends or by positioning only the blades and forming a plastic spacer during the subsequent molding step. An alternative is to mold as described above, around a previously formed and assembled composite of the two blades separated by a spacer.

As used in this application disposable razor is meant to include a disposable cartridge. It is obvious that the same technology can be applied to cartridges.

We claim:

1. A method for making a disposable razor with a blade, blade support means, a handle means and blade covering means wherein said blade support means, handle means, and blade covering means are made of thermoplastic material comprising:
   a) mating a blade to a thermoplastic blade support by molding said blade support around said blade, said blade support forming at least part of at least one of said means and covering a longitudinally central part of one surface of said blade but terminating before the longitudinal ends of said blade; and
   b) molding the remaining thermoplastic components around the blade-support combination.

2. Method of claim 1 wherein the blade is attached to the blade support at the time the blade support is formed.

3. Method of claim 1 wherein the blade is mated to the blade support by allowing fluid thermoplastic material forming of the blade support to flow through at least one orifice of the blade to cover a portion of the opposite surface of the blade surrounding said orifice.

4. The method of claim 1 wherein the entire razor is formed in a single mold.

5. A method for forming a disposable razor having handle means, blade support means, and blade covering means with all nonblade parts made with thermoplastic material comprising:
   a) forming a blade support of thermoplastic material to mate with a blade set in a predetermined position in a mold, said support terminating before the longitudinal ends of said blade set; and
   b) subsequently molding the remaining parts of the razor in the same mold.

6. The method of claim 5 wherein the remaining parts of the razor are molded to said subassembly in a single step.

7. The method of claims 1,2,3, or 5 wherein the blade support is the handle means.

* * * * *